United States Patent [19]

Rao et al.

[11] 4,360,573
[45] Nov. 23, 1982

[54] ELECTROCHEMICAL CELL CONSTRUCTION

[75] Inventors: T. V. Rao, Coon Rapids; Thomas M. Nutzman, Andover, both of Minn.

[73] Assignee: Medtronic, Inc., Minneapolis, Minn.

[21] Appl. No.: 264,791

[22] Filed: May 18, 1981

[51] Int. Cl.$^3$ ............................................. H01M 2/36
[52] U.S. Cl. ..................................... 429/72; 429/101; 429/118; 429/196
[58] Field of Search ...................... 429/72, 52, 50, 51, 429/101, 196, 121, 122, 110, 118

[56] References Cited

U.S. PATENT DOCUMENTS

| 3,475,226 | 10/1969 | Fraisli | 136/162 |
| 3,867,201 | 2/1975 | Holmes | 136/114 |
| 3,945,846 | 3/1976 | Dey | 136/100 R |

Primary Examiner—Charles F. LeFevour
Attorney, Agent, or Firm—Schroeder, Siegfried, Vidas, Steffey & Arrett

[57] ABSTRACT

Electrochemical cell containers having a penetrable, self-sealing septum for filling.

8 Claims, 2 Drawing Figures

ELECTROCHEMICAL CELL CONSTRUCTION

BACKGROUND OF PRIOR ART

This invention relates to electrochemical cells of improved construction. Specifically it is concerned with cells having a penetrable, self-sealing septum in the filler opening of the cell container for the introduction of a fluid cell component or components into the container. For purposes of this invention, the term "fluid" is meant to describe any component capable of flowing into the cell container. In most instances, the component will be a liquid.

The following listed U.S. Patents show various lithium-halogen batteries or cells making use of cell containers in which a fluid component is introduced into the container through a filler opening: U.S. Pat. Nos. 4,105,833; 4,135,519; 4,132,836; 4,166,887 and 4,211,832. All of these patents are incorporated herein by reference.

Other electrochemical cells incorporating different components may make use of the invention. It should be understood that the fluid component used need be in fluid form only at the time of its introduction into the cell container. Thereafter, it may solidify or assume any other form as required by the particular cell involved.

BRIEF SUMMARY OF THE INVENTION

This invention provides an improvement in electrochemical cell construction wherein the cell container filler opening includes a penetrable, self-sealing septum.

DETAILED DESCRIPTION OF THE INVENTION

Figure 1:
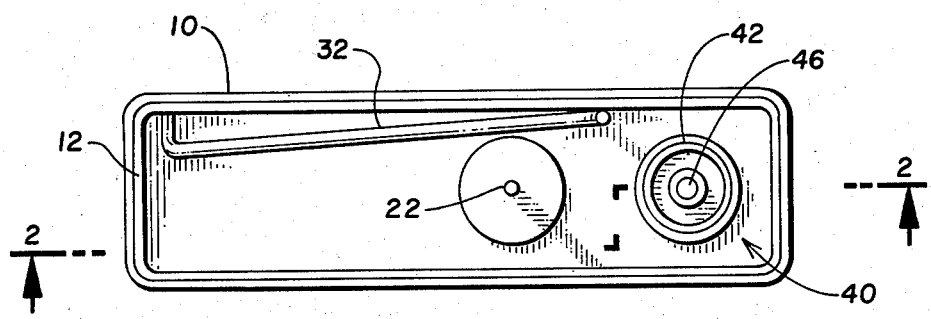
FIG. 1 is a top elevational view of an electrochemical cell illustrating the improved construction of the invention.

Referring now to the Figures, a hermetically sealed lithium-halogen cell is illustrated showing the preferred form of the invention. The cell comprises a container 10 of metal such as stainless steel. Container 10 has an open top or end which is closed by means of a lid 12, also of stainless steel, which is welded to container 10. The cell further includes anode means, in this case comprising a lithium element 14 having an embedded anode current collector element 18. Current collector 18 is a relatively thin element of nickel or zirconium. A conductor lead feedthrough assembly 20 including lead 22 of stainless steel or other suitable metal is spot welded to collector element 18. Electrical lead 22 is of sufficient length to extend out of the container 10 for making an external electrical connection thereto. Conductor 22 is sealed from the remainder of the cell contents by means including an insulator element generally designated 24 which surrounds lead 22. Insulator 24 is of a material which in addition to being a non-conductor of electricity is also non-reactive with the contents of the cell, such as the halogen cathode materials utilized in the cell illustrated. One form of material found to perform satisfactorily are the fluoropolymers, such as the one available under the Tradename "Halar", a trademark of the Allied Chemical Company. Other non-reactive materials may be used for insulator 24.

The anode assembly comprising the lithium element 14, for example, and current collector 18 is preferably fitted within an anode holding or retention means comprised of a peripheral frame member in the form of a band 30 which peripherally encloses the anode assembly leaving the major lateral surface areas of the lithium element exposed. Band 30 is preferably of the aforementioned fluoropolymer material or any similar material which is non-reactive with the cell contents. In the present illustration, lithium element 14 is of a sandwich-like construction in which two pieces of lithium are brought together with collector 18 therebetween. Band 30 surrounds the peripheral edge of lithium element 14 engaging the peripheral contact surfaces provided at the joint area formed between the lithium pieces. The opposite ends of band 30 are provided with apertures of a size sufficient to receive a portion of insulator 24. These ends are overlapped adjacent the insulator as shown in FIG. 2 to provide a wrap-around structure.

Figure 2:
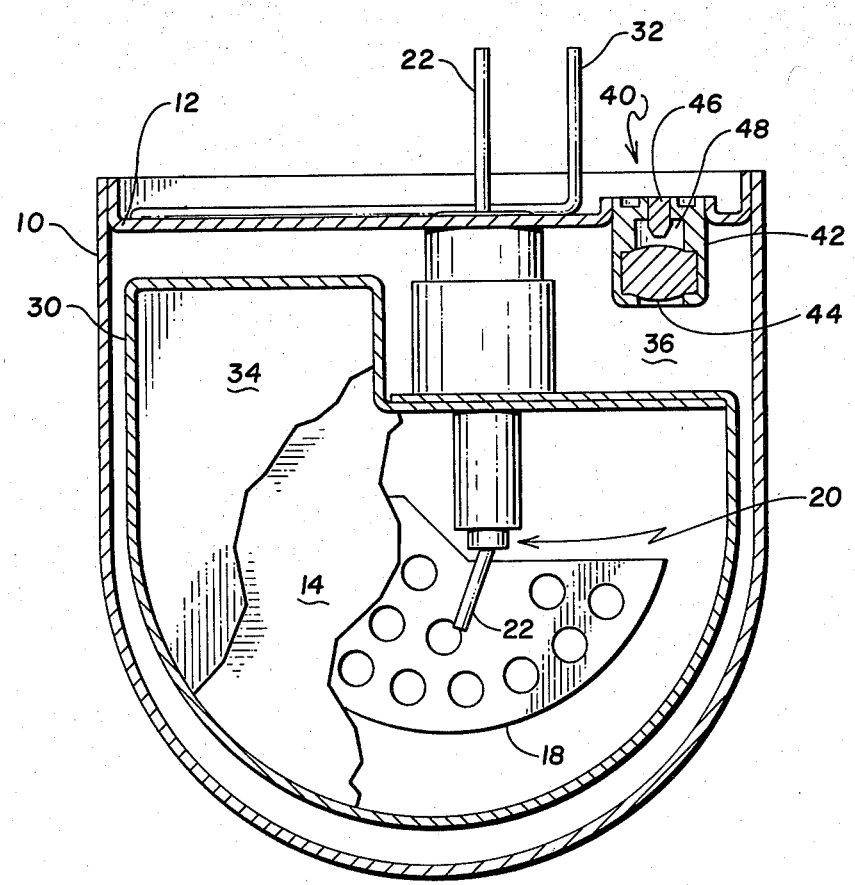
FIG. 2 is a side elevational view in section along line 2—2 of FIG. 1 with parts removed illustrating the invention in more detail.

The anode assembly may be provided with an organic coating 34 as is known in the art and then positioned in container 10 as shown in FIG. 2 with the lateral anode operative surfaces spaced from the inner surface of the container. Lid 12 is then welded to container 10.

In the particular embodiment illustrated container 10, being of electrically conducting material, serves as a cathode current collector in direct contact with the cathodic contents of container 10. Consequently, an electrical lead 32 may be attached directly to container 10 for cathodic contact.

In the prior art, a halogen cathode material 36 such as iodine or bromine contained in an organic component material, as is also known in the art, was poured through a suitable filler opening in lid 12 to fill container 10 and operatively contact the exposed surfaces of the lithium anode. For example, a common cathode material is prepared by heating a poly(vinylpyridine) organic material, such as poly(2-vinylpyridine), mixed with iodine, to a temperature greater than the crystallization temperature of iodine, for example about 300° F. Consequently, the mixture becomes fluid. The amount of iodine is ordinarily greater than about 50% by weight of the resulting mixture. The resulting mixture upon heating was poured into container 10 to substantially fill it. The amount of material introduced into the container is preferably sufficient to contact the lateral surfaces of lithium element 14 and to reach a level at or adjacent the interior surface of lid 12. The opening in lid 12 was then hermetically sealed with a series of plugs such as an inner Teflon plug and an outer stainless steel plug or plugs (not shown).

In accordance with the present invention the foregoing filler arrangement plug construction is modified by means of the improved sealing subassembly generally indicated at 40. Subassembly 40 includes a metal sleeve 42 of stainless steel or the like which includes a penetrable self-sealing septum 44, preferably at an inner location as shown in FIG. 2. Sleeve 42 is welded into an opening in lid 12 as shown. Self-sealing septum 44 may be molded into sleeve 42 or it may be preformed and seated in the sleeve by forming the sleeve around septum 44 as shown. Any other means suitable for sealing the septum in the sleeve may be used. Self-sealing septums and the materials therefor are known. They are made of a flexible, resilient body of a suitable material such as rubber which seals itself when punctured. Typically, silicone rubber, fluoro-silicone rubber or fluorocarbon rubber may be used. The latter is available under the tradename Viton, a trademark of DuPont. A thickness on the order of 0.080 inches is satisfactory although this is not critical so long as sealing is assured. Thus, thickness may vary over a wide range.

With such a septum in place as shown in the drawing, a hypodermic-like needle may be inserted through septum 44 by means of which container 10 may be evacuated and then filled with any fluid component or components of the cell, such as the aforementioned cathode material 36. The method of filling is more fully described in copending application entitled "Electrochemical Cell Construction and Filling Method", filed of even date herewith and assigned to the same assignee.

Following the filling of container 10 by means of penetration and removal of the self-sealing septum 44, a metal plug 46 is inserted into sleeve 42 and preferably welded into position. As is shown, an antechamber or cavity 48 preferably is provided between plug 46 and septum 44.

Antechamber 48 is useful as a void volume for helium to check the hermeticity of the weld between sleeve 42 and metal plug 46. A method of checking a cell, having a self-sealing fill septum, for hermeticity is described in copending application entitled "Leak Detection For Hermetic Enclosures", filed of even date herewith and assigned to the same assignee.

While a preferred embodiment has been described in detail, this has not been done for purposes of limitation but by way of illustration. The invention is intended to be defined by the following claims:

We claim:

1. In an electrochemical cell of the type having a metal container for housing cell components, and an opening in the container for introducing a component into the container, the improvement comprising penetrable, self-sealing septum means closing the opening whereby a fluid component may be introduced into the container through the septum means by means of a hypodermic-like needle and wherein the septum means includes a metal sleeve carried in the opening, the sleeve defining a filler opening into the container having inner and outer closure areas, the self-sealing septum closing the inner closure area, the sleeve further including a metal plug closing the outer closure area.

2. The improved cell of claim 1 wherein the metal sleeve is welded to the metal container and the metal plug is welded to the metal sleeve.

3. The improved cell of claim 1 wherein a cavity is provided in the sleeve between the septum and the plug.

4. The cell of claim 1 wherein the cell component is introduced into the cell as a fluid comprises the cathode of the cell.

5. The cell of claim 4 wherein the cathode comprises an organic material and iodine.

6. The cell of claim 4 wherein the cathode includes the product resulting from a heated mixture of poly(2-vinylpyridine) and iodine.

7. The cell of claim 1 wherein the fluid cell component includes thionyl chloride.

8. The cell of claim 1 wherein the septum is a rubber material.

* * * * *

UNITED STATES PATENT AND TRADEMARK OFFICE
CERTIFICATE OF CORRECTION

PATENT NO. : 4,360,573
DATED : November 23, 1982
INVENTOR(S) : T. V. Rao et al

It is certified that error appears in the above-identified patent and that said Letters Patent are hereby corrected as shown below:

Column 3, line 20, after the words "penetration and removal of", insert --a needle from--.

Signed and Sealed this

Thirteenth Day of March 1984

[SEAL]

Attest:

GERALD J. MOSSINGHOFF

Attesting Officer  Commissioner of Patents and Trademarks